July 12, 1960 N. S. SHIRK 2,944,897
REVERSAL FILM METHOD
Filed Dec. 12, 1956
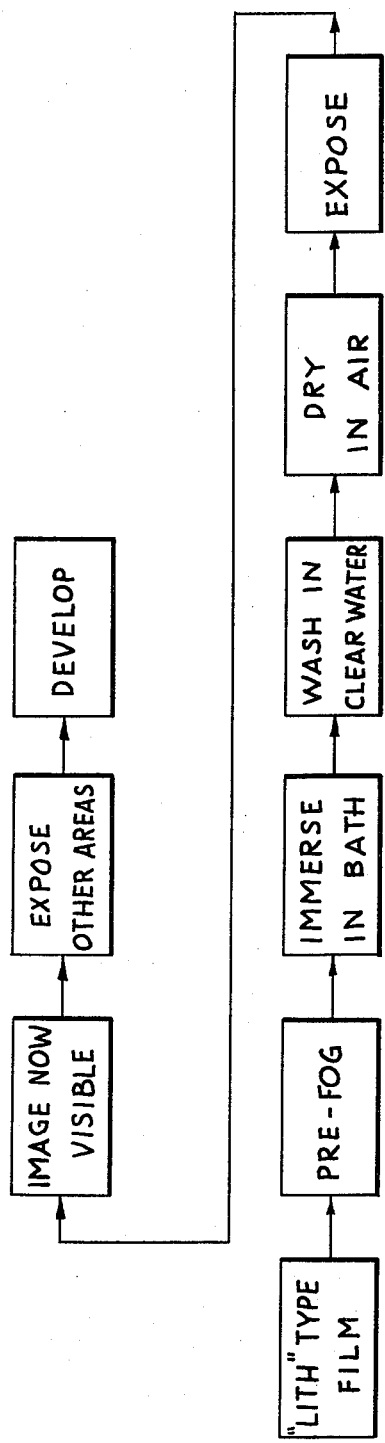
INVENTOR.
NEWMAN S. SHIRK
BY
ATTORNEYS.

2,944,897

REVERSAL FILM METHOD

Newman S. Shirk, Concordville, Pa.
(1423 Carroll Brown Way, West Chester, Pa.)

Filed Dec. 12, 1956, Ser. No. 627,876

4 Claims. (Cl. 96—64)

The present invention has to do with photographic films, and is concerned primarily with a method of terating a known manufactured film to impart reversal characteristics thereto.

At the present time, it is common practice in the field of graphic arts to utilize photographic techniques in reproducing original copy. The particular method involved may be photoengraving, photolithography, silk-screen printing, or any related process which requires the use of high-contrast and grainless films for duplicating purposes. These photographic techniques are employed to reproduce printed matter on any suitable base, such as paper, cloth, metal, or any other surface.

In the preparation of negative layouts from which the printing matrix is to be made, there is frequent need for duplicate negatives or duplicate positives. Moreover, it is often desirable that a negative be made directly from a negative or a positive directly from a positive. Some times these are required in geometric multiplicity, as in label printing. Sometimes a simple lateral reversal is required. At times a complicated set of smaller negatives is assembled into one master negative layout by taping the smaller pieces together with Scotch tape. Such a layout becomes touchy and fragile. Their relative positions may be frozen by contact-printing the assembly onto a single piece of film. The reversal film of this invention will enable the operator to obtain a duplicate negative in a single operation.

With the foregoing conditions in mind, the present invention has in view as its foremost objective the provision of a method of processing photographic film of a high-contrast or "lith" type which are employed in the field of graphic arts so as to cause such already manufactured and finished emulsions to reverse upon simple exposure to light so as to produce a negative directly from a negative and a positive directly from a positive.

While there are several well-known methods of producing reversal effects, whereby initial exposure upon an emulsion is modified by a second exposure on the same area, this invention is concerned primarily with the effect which is known as solarization and which involves the chemical treatment of manufactured film. The present invention is not concerned with these other effects, among which might be noted the Herschel effect, the Albert effect, and the Sabattier effect.

Another object in view is to provide a method of the character above indicated which begins with a manufactured photographic film of the lith type. One example of such a film is Kodalith, which is manufactured by the Eastman Company. Such a film ordinarily comprises an acetate base which carries a silver-bromide emulsion. An important and characteristic step of the present invention is to expose this film for a proper period of time to impart thereto a so-called "prefogging" effect. When the film is prefogged, the silver emulsion becomes developable due to the fact that the density of the silver layer increases with the amount of light which enters the emulsion, and this ratio continues up to a certain point. Beyond that point the ratio changes and will continue to do so until, instead of producing a negative of increasing density, the entire process will be reversed and a positive will result.

Another important object of this invention is to take practical advantage of the prefogging step by subjecting the prefogged film to a chemical bath which properly fixes this characteristic of the film.

Still another object of the invention is to provide, in a method of the character aforesaid, the step of washing the film in clear water after being subjected to the chemical bath. This step of washing is then followed by drying, after which the film or any part thereof is in proper condition for exposure. If a particular area of the film is to be exposed, the remaining area is masked off.

After this initial exposure and prior to development, the image on the film is visible to the naked eye. Thus other additional exposures may be accurately brought into proper register therewith, which is a feature of the utmost importance in the field of the graphic arts.

After a film has been fully exposed by repeated exposures as above indicated, it is finally developed in accordance with any of the well-known developing methods.

Various other more detailed objects and advantages of the invention, such as arise in connnection with carrying out the above-noted ideas in a practical embodiment, will in part become apparent and in part be hereinafter stated as the description of the invention proceeds.

The invention therefore comprises a reversal film method which consists essentially of beginning with manufactured film of the lith type, prefogging the film by exposure to light for a predetermined period, immersing the prefogged film in a chemical bath, washing the film in clear water, drying in air, and then subjecting the film or any part thereof to exposure while masking off the unexposed parts.

For a full and more complete understanding of the invention, reference may be had to the following description and accompanying drawing, wherein the figure is a flow chart which diagrammatically illustrates the method of this invention.

Referring now to the drawing, it will be noted that the method of this invention begins with a manufactured film of the lith type. Among such known films are those put out under the trademarks Kodalith, Reprolith, Fotolith, and Dinoc. Kodalith is a film manufactured by the Eastman Corporation; and it may be stated that this, as well as the other films which are suitable as the starting point of the method of this invention, is a high-contrast and grainless film. Moreover, it ordinarily comprises an acetate base which carries a silver-bromide emulsion.

The first step in the method of this invention is to prefog this film by exposing it to light. The exact pre-fogging period is not critical, although it should be of a duration of from three to ten seconds and is made under incandescent light.

After profogging, the film is subject to a chemical bath. This bath is ordinarily of ambient temperature, and the duration thereof is not particularly critical, although it should have a minimum duration of fifteen seconds. Any time in excess thereof is not of particular importance.

It has been found that several simple inorganic chemical compounds and some simple organic compounds in proper concentration will serve satisfactorily as the chemical for the solarization bath. Generally speaking, it has been found that solutions of one to two percent concentration are highly satisfactory. While it is possible to obtain usable negatives when weaker or stronger solutions are used, the invention is concerned primarily with those procedures which will produce the most commercially acceptable results.

The list of chemicals which may be used for the bath includes both strong acids and weak acids, strong and weak alkalies, and neutral salts of acids and bases. Among these chemicals are sodium chloride, calcium chloride, potassium bromide, sodium hypochlorite, lead nitrate, potassium nitrate, copper nitrate, copper sulfate, aluminum sulfate, ferric sulfate, manganese sulfate, magnesium sulfate, zinc sulfate, uranium nitrate, potassium carbonate, sodium carbonate, potassium bichromate, Rochelle salts, acetic acid, hydrochloric acid, nitric acid, aqua regia, potassium hydroxide, sodium hydroxide, ammonium hydroxide, and hydrogen peroxide.

As an example of a preferred chemical, potassium bromide may be taken as giving the best results, particularly when used in a concentration of one or two percent. Hydrochloric acid is a close second at the same concentration. When acetic acid is employed, it should be at a concentration of one quarter to one-half of one percent.

After being immersed in the bath for at least fifteen seconds, the next step is to wash or rinse in clear water. This washing step is carried out at ambient temperatures and should be continued sufficiently long to remove all excess and free chemicals. The film is now dried in air, and the drying also takes place at ambient temperatures.

The film is now in condition for exposure. The exposure may be for the entire film or any part thereof with remaining areas masked off. As one example of how much an exposure is made, it is noted that a vacuum frame and arc light may be employed. The light may be a thirty-five-ampere carbon arc, and the working distance of from three to four feet. The time period for such an exposure will average from five to ten seconds. After such an exposure, the image is now visible and discernible so that subsequent exposures may be made by masking off the areas already exposed; and the fact that the images on the exposed areas are visible makes it possible and entirely practical to bring the other exposures into accurate registration therewith.

The procedures provided by this invention make possible the assembly and registration of many smaller negatives into one larger composite by contact printing each small negative in its correct position in the assembly by means of successive exposures, making sure, of course, to mask out the area that should not be exposed at each stage of the operation. These procedures may be employed on any of the regular emulsions manufactured by the several well-known manufacturers who supply film for use in the graphic arts. The results may be had whether the emulsion be coated on the regular acetate base, on the newer stable-base supports, or on glass.

This invention enables the photographer to make step-and-repeat film assemblies without the use of costly step-and-repeat machines. This is made possible because the image resulting from each exposure is visible before development. The emulsion, due to the chemical treatment, is effectively slowed down by a factor of a thousand or two. The latter feature makes it possible for the operator to work in subdued light or in indirect room light for some time without affecting the emulsion noticeably. If the operation will be prolonged, it is convenient to register the several successive negatives over a stripping table with a sheet of red acetate masking the white light from the emulsion.

By means of a magnifier, the register marks on the negative may be placed "dead on" the previously exposed but as yet undeveloped register marks of the previous exposure, and held firmly in place for the next exposure by Scotch tape. Many such successive exposures may be composed without even using register marks simply by visually placing the second negative in its correct relative position to the first exposure by simple visual registration, by measuring with a ruler, or by squaring off with straight edge and T-square.

The visual predevelopment images are, of course, positive images; but upon development they become negative images exactly like the original negatives. Extremely accurate drawings of a symmetrical nature, such as are frequently used in template work, may be accomplished by drawing one half accurately. A negative is made of that half. A contact exposure of that negative, emulsion to emulsion, on a solarized film or plate, will result in a lateral reversal or mirror image of the first negative. If both are now alternately contacted to a third solarized emulsion, accurately registering the common axis, development will produce the desired complete drawing with both halves completely symmetrical about their axis.

It has been stated that the emulsion of the solarized film has become very slow due to the solarizing chemical treatment and the necessity for a long exposure in order to reach the solarizing portion of the exposure-density curve. If this preferred film is placed in the developer without giving it the second, or image, exposure, it will develop up completely black. When the image exposure is given before development, the exposure effectively nullifies the effect of the first fogging exposure only in those areas where the light penetrates the clear portions of the superposed positive or negative. The very nature of the action is valuable in another way in making of duplicate negatives. After the first negative is made by normal methods, it is often necessary to retouch the negative, opaque it, outline it with opaque as in outlined half tones, or even to add clear areas to the negatives by scribing line work into the emulsion or by chemically reducing it as in dot-etching half tone. When duplicate negatives are required, it is obviously a great advantage to do all this work on the original master negative, for then all subsequent solarized copies made from it will automatically have all the retouch work incorporated in them.

Processing the final solarized film is exactly the same as the processing of the original film in its original form, and according to the manufacturers' recommendations. There are no special solutions nor special procedures, except that the development may be carried out in white light if desired.

Exposure is by arc light, the same arc light that is employed in exposing sensitized metal for engraving or offset plate making. Exposures usually run between one second and thirty seconds, depending upon the original speed of the emulsion, the distance from arc lamp to film, and the intensity of the light itself. Commonly, single or double thirty-five-ampere carbon arcs are employed, but any light source giving actinic light will suffice if exposure is long enough.

While preferred specific embodiments of the invention are hereinbefore set forth, it is tobe clearly understood that the invention is not to be limited to the exact materials, steps, and conditions illustrated and described, because various modifications of these details may be provided in putting the invention into practice within the purview of the appended claims.

What is claimed is:

1. In the treatment of photographic film, the method comprising the steps of: (a) beginning with a manufactured high-contrast grainless film of a silver-bromide emulsion on an acetate base as the starting point of the method, (b) prefogging said film by exposing it to light for a predetermined period, (c) immersing the prefogged film in a solarizing bath, the bath being an aqueous solution of a compound taken from the group consisting of: sodium chloride, calcium chloride, potassium bromide, sodium hypochlorite, lead nitrate, potassium nitrate, copper nitrate, copper sulfate, aluminum sulfate, ferric sulfate, manganese sulfate, magnesium sulfate, zinc sulfate, uranium nitrate, potassium carbonate, sodium carbonate, potassium bichromate, Rochelle salts, acetic acid, hydrochloric acid, nitric acid, aqua regia, potassium hydroxide, sodium hydroxide, ammonium hydroxide, and hydrogen peroxide, (d) washing the film in clear water, (e) drying the washed film, (f) exposing a given area of said film to create an image thereon that is visible prior to development, and (g) then developing said film.

2. In the treatment of photographic film, the method comprising the steps of: (a) beginning with a manufactured high-contrast grainless film of a silver-bromide emulsion on an acetate base as the starting point of the method, (b) prefogging said film by exposing it to light for a period ranging from three to ten seconds, (c) immersing said prefogged film in a solarizing bath for a period of at least fifteen seconds, said bath being an aqueous solution of a compound taken from the group consisting of: sodium chloride, calcium chloride, potassium bromide, sodium hypochlorite, lead nitrate, potassium nitrate, copper nitrate, copper sulfate, aluminum sulfate, ferric sulfate, manganese sulfate, magnesium sulfate, zinc sulfate, uranium nitrate, potassium carbonate, sodium carbonate, potassium bichromate, Rochelle salts, acetic acid, hydrochloric acid, nitric acid, aqua regia, potassium hydroxide, sodium hydroxide, ammonium hydroxide, and hydrogen peroxide, (d) washing the film in clear water, (e) drying the washed film, (f) exposing a given area of said film to create an image thereon that is visible prior to development, and (g) then developing said film.

3. In the treatment of photographic film, the method comprising the steps of: (a) beginning with a manufactured high-contrast grainless film of a silver-bromide emulsion on an acetate base as the starting point of the method, (b) prefogging said film by exposing it to light for a predetermined period, (c) immersing the prefogged film in a solarizing bath, said bath being an aqueous solution of a compound taken from the group consisting of: sodium chloride, calcium chloride, potassium bromide, sodium hypochlorite, lead nitrate, potassium nitrate, copper nitrate, copper sulfate, aluminum sulfate, ferric sulfate, manganese sulfate, magnesium sulfate, zinc sulfate, uranium nitrate, potassium carbonate, sodium carbonate, potassium bichromate, Rochelle salts, acetic acid, hydrochloric acid, nitric acid, aqua regia, potassium hydroxide, sodium hydroxide, ammonium hydroxide and hydrogen peroxide, (d) washing the film in clear water, (e) drying the washed film, (f) exposing an area of said film at the same time masking out the remaining areas to create a visible image on said exposed area, (g) exposing a second area while masking out the remaining areas to create a second image in register with said first image, and (h) developing said exposed film.

4. In the production of a reversal photographic film, the method comprising the steps of: (a) taking a manufactured high-contrast grainless film of a silver-bromide emulsion on an acetate base and prefogging it by exposure to light, (b) immersing the prefogged film in a solarizing bath, said bath being an aqueous solution of a compound taken from the group consisting of: sodium chloride, calcium chloride, potassium bromide, sodium hypochlorite, lead nitrate, potassium nitrate, copper nitrate, copper sulfate, aluminum sulfate, ferric sulfate, manganese sulfate, magnesium sulfate, zinc sulfate, uranium nitrate, potassium carbonate, sodium carbonate, potassium bichromate, Rochelle salts, acetic acid, hydrochloric acid, nitric acid, aqua regia, potassium hydroxide, sodium hydroxide, ammonium hydroxide, and hydrogen peroxide, (c) washing the film, (d) drying the washed film, (e) then exposing a given area of said film while masking out the remaining areas to create a visible image thereon, (f) repeating the exposing to create other images in proper register with said first image, and (g) then finally developing said film.

References Cited in the file of this patent

UNITED STATES PATENTS

| | | |
|---|---|---|
| Re. 20,582 | Dreyer | Dec. 14, 1937 |
| 1,966,332 | Capstaff et al. | July 10, 1934 |
| 2,005,837 | Arens | June 25, 1935 |
| 2,126,516 | Szasz | Aug. 9, 1938 |
| 2,401,051 | Crouse et al. | May 28, 1946 |

FOREIGN PATENTS

| | | |
|---|---|---|
| 462,730 | Britain | Mar. 15, 1937 |

OTHER REFERENCES

American Photography, 20, Dec. 1926, pp. 654–664.
Photography Theory & Practice, Clerc, 1954, pp. 311, 328, 329.